United States Patent [19]

Harada et al.

[11] 4,179,279
[45] Dec. 18, 1979

[54] PROCESS FOR TREATING MOLTEN STEEL SLAG WITH RED MUD FROM ALUMINUM INDUSTRY

[75] Inventors: Genzaburo Harada; Takuma Yen; Masao Tomari, all of Kitakyushu, Japan

[73] Assignee: Nippon Jiryoku Senko Co., Ltd., Fukuoka, Japan

[21] Appl. No.: 873,329

[22] Filed: Jan. 30, 1978

Related U.S. Application Data

[63] Continuation of Ser. No. 727,502, Sep. 28, 1976, abandoned.

[30] Foreign Application Priority Data

Oct. 9, 1975 [JP] Japan .................................. 50-122136
Nov. 7, 1975 [JP] Japan .................................. 50-134518

[51] Int. Cl.$^2$ ................................................ C12B 3/04
[52] U.S. Cl. ...................................... 75/24; 106/288 B
[58] Field of Search .................... 106/288 B; 75/24, 40

[56] References Cited

U.S. PATENT DOCUMENTS 3,495,973  2/1970  Ban et al. .................................... 75/5
3,876,749  4/1975  Horvath et al. ........................... 75/30

FOREIGN PATENT DOCUMENTS 1074209  6/1967  United Kingdom ........................ 75/24

Primary Examiner—M. J. Andrews
Attorney, Agent, or Firm—Frank J. Jordan

[57] ABSTRACT

A process for diminishing the collapsibility of steel slag by the addition of red mud obtained from the aluminum industry is disclosed.

3 Claims, No Drawings

PROCESS FOR TREATING MOLTEN STEEL SLAG WITH RED MUD FROM ALUMINUM INDUSTRY

This is a continuation of application Ser. No. 727,502, filed Sept. 28, 1976 now abandoned.

BACKGROUND OF THE INVENTION

This invention relates to a process for producing, having non-collapsing properties and a process for recovering iron components from the processed slag.

Slag produced from a steel making process which used LD converters or electric furnaces (hereafter referred as steel slag) usually takes a fairly long time to reach a stable state. For example, what might appear to be a hard lump often swells and crumbles, after a while, to finer particles. Flat surfaces formed of land fill of unweathered steel slag in the sea or valley would later exhibit undulating surfaces causing great difficulties to any buildings erected hastily after land reclamation. A road made using steel slag for the base as a substitute for crushed stone would almost for sure become unusable fairly soon.

Unless a fairly long time is allowed to complete the weathering of steel slag it can not be used as a substitute for crushed stone or sand for constructional work or as a reliable material for land fill. For weathering, a vast tract of land is of course necessary, which is especially costly in Japan. Recently dumping in the sea is regulated from the view point of pollution control and some steel mills are forced to haul steel slag long distance to designated areas in the ocean for dumping.

The weathering of steel slag is considered to be caused by volume increase of Free CaO and $2CaO.SiO_2$ (hereafter to be referred as $C_2S$), the former swells by absorbing water and changes to $Ca(OH)_2$ and the latter by a phase shift.

Namely, $2CaO.SiO_2$, which takes four forms or phases, $\alpha \rightarrow \alpha' \rightarrow \beta \rightarrow \gamma$, rapidly and greatly increases the volume thereof when it transforms from its $\beta$ form to its $\gamma$ form. Due to the above sudden swelling, $2CaO.SiO_2$ collapses or dusts. One way to suppress the weathering of slag is a rapid cooling of steel slag, but this method is cumbersome and the practical effect does not seem to be too great.

We have found a process to prohibit the weathering of steel slag by adding red mud produced from the aluminum industry to molten steel slag, thereby transforming Free CaO and $C_2S$ to other compositions which would will not swell or crumble. We have further found that the addition of reducing agents such as coke or blast furnace thickner dust along with red mud to molten steel slag has the effect of reducing some of the iron oxides contained mainly in molten slag to metallic form, thereby recovering the thus reduced metallic iron, together with the metallic iron left from the previous process, and some of the magnetic iron oxide.

Red mud is the residue of the process of treating bauxite by caustic soda under high pressure. Particle size of red mud is very small. Usually more than half of the total particles are under 2 microns. Sometimes the iron content of red mud is close to 50% (all "percent" in this specification are by weight.), but further up grade is considerably difficult. Fine particles of peculiar red color tend to cause pollution. Therefore red mud has heretofore generally been nothing but a cause for headache. We have, for more than 20 years, been engaged in steel slag treatment on the one hand and investigation of economic treatment of red mud on the other, and we have succeeded in combining these two fields of technology which have so far seemed discretely separate.

The melting point of red mud is about 1250° C., which is 200°-300° C. lower than that of steel slag.

It is an object of the present invention to provide a process for producing slag having non-collapsing properties which is characterized in that red mud and molten slag produced by a converter furnace or an electric furnace both of which have been used heretofore but in extremely limited industrial areas but which can now be utilized to a full extent.

It is another object of the present invention to provide a process for producing slag having non-collapsing properties without necessitating quenching (rapid cooling) of the molten slag wherein the process is characterized in that red mud is charged into the molten slag produced by a converter furnace or an electric furnace so that the charged and melted red mud reacts with the molten slag resulting in the production of processed slag which has non-collapsing properties.

DETAILED DESCRIPTION OF THE INVENTION

This invention relates to a process for producing slag which does not collapse easily by making use of red mud discharged from an aluminum refining plant.

The manner in which the above slag is produced is hereinafter disclosed.

First red mud which is prepared either in the form of briquettes or pellets is charged into molten slag produced by a converter furnace or an electric furnace. In this operation, molten slag may preferably be received or carried within a molten slag receiving ladle. When red mud is charged in the above way, since the red mud has a melting point of around 1250° C. which is substantially lower than the temperature of molten slag, the red mud easily melts within the molten slag.

The thus melted red mud which substantially contains $Al_2O_3$, $SiO_2$, $Na_2O$, $K_2O$ and the like besides $Fe_2O_3$ reacts with the molten slag so that molten slag containing Free CaO (hereafter referred to as F.CaO and $C_2S$ both of which are substances that causes collapsing of slag) converts the compositions thereof thereby resulting in the production of processed slag having non-collapsing properties.

In the above operation, it must be noted that the melting of red mud and the subsequent chemical reaction between molten slag and melted red mud are both effected by the heat contained in the molten slag since the melting point of the red mud is considerably lower than the temperature of molten slag.

In general, the heat of molten slag produced by a converter furnace or an electric furnace is about 450,000 kcal/ton. Therefore, the amount of red mud which can be melted by the above molten slag is up to 20 percent of the molten slag after the red mud is added. Accordingly, if the amount of red mud to be melted exceeds this approximately 20 percent figure, additional heat must be provided from an outside source.

In practice, the above red mud can be added to and melted in the molten slag up until after the amount of red mud accounts for 50 percent of the molten slag after the addition of red mud when an outside heat source is provided.

Experiment

Table 1 shows the results of the gravimetric analysis conducted on slag produced by a converter furnace, slag produced by an electric furnace and red mud all of which are used in the process of this experiment for producing the processed slag having non-collapsing properties.

Several mixed materials which were produced by mixing some of the materials listed on Table 1 were melted within a siliconit electric furnace for 15 minutes, the inner temperature of which was maintained at 1450°±10° C. These melted mixed materials were then cooled by air outside of the furnace.

The thus obtained products were then subject to X-ray diffraction test and chemical analysis, the data of which is shown in Table 2.

These products were also soaked in boiled water for testing the collapsing ratio of products wherein the data of the test is also shown in Table 2 along with the data on the X-ray diffraction test and chemical analysis of products.

Table 2

Chemical analysis and physical properties of non-processed slag and processed slag with red mud addition

| ratio of raw materials | | P.C.E.* (°C.) | collapsion (%) | minerals in slag — main component | minerals in slag — Subcomponent | F CaO (%) |
|---|---|---|---|---|---|---|
| converter slag | 100% | 1520 | 12.9 | α-2CaO·SiO$_2$<br>β-2CaO·SiO$_2$ | FeO (Wustite)<br>Ca(OH)$_2$<br>2CaO·MgO·2SiO$_2$<br>(Akermanite) | 5.12 |
| converter slag<br>red mud | 70%<br>30% | 1320 | 0.0 | 3CaO·Al$_2$O$_3$<br>2CaO·Al$_2$O$_3$<br>SiO$_2$<br>(Gehlenite) | Fe$_2$O$_3$ (Hematite) | 0.00 |
| electric furnace oxidizing slag | 100% | 1510 | 2.3 | β-2CaO·SiO$_2$ | 2CaO·MgO·2SiO$_2$<br>(Akermanite)<br>Fe$_2$O$_3$ (Hematite)<br>FeO (Wustite) | 0.47 |
| electric furnace oxidizing slag<br>red mud | 70%<br>30% | 1220 | 0.0 | 2CaO·Fe$_2$O$_3$ | 3CaO·Al$_2$O$_3$<br>CaO·Al$_2$O$_3$ | 0.00 |
| electric furnace reducing slag | 100% | 1540 | — | α-2CaO·SiO$_2$<br>Ca(OH)$_2$ | CaO·SiO$_2$<br>(Wollastonite) | 6.45 |
| electric furnace reducing slag<br>red mud | 70%<br>30% | 1235 | 0.0 | 3CaO·Al$_2$O$_3$ | 2CaO·Fe$_2$O$_3$<br>CaO·Al$_2$O$_3$ | 0.00 |

*Standard method of test for pyrometric cone equivalent.

It must be noted that the collapsing ratio of electric furnace slag during the reduction period could not be obtained since the slag was entirely collapsed when it

Table 1

| | Ignition Loss | SiO$_2$ | Al$_2$O$_3$ | Fe$_2$O$_3$ | CaO | MgO | Na$_2$O | K$_2$O | MnO | P$_2$O$_5$ | TiO$_2$ | F.CaO |
|---|---|---|---|---|---|---|---|---|---|---|---|---|
| converter slag | +0.90 | 16.50 | 2.30 | 25.50 | 45.45 | 3.55 | 0.85 | 0.35 | 4.50 | 2.00 | — | 5.12 |
| electric furnace slag (oxidizing period) | +0.79 | 19.40 | 4.30 | 27.50 | 39.00 | 4.20 | 0.48 | 0.35 | — | — | — | 0.47 |
| electric furnace slag (reducing period) | 0.70 | 28.20 | 6.50 | 2.80 | 49.30 | 5.00 | 0.75 | 0.20 | — | — | — | 6.45 |
| red mud | 12.15 | 9.80 | 21.05 | 44.20 | 1.50 | 3.80 | 1.20 | 0.45 | — | — | 5.85 | — | was taken as a test material or sample.

As can be clearly observed from Table 2, F.CaO and 2CaO.SiO$_2$ which cause collapsing of slag were substantially absent (this implies that those two compositions seemed to have been chemically transformed to other substances having a non-collapsing property) and the processed slags showed the stable compositions thereof.

Table 3 shows some data of chemical analysis conducted on the processed slags which now have substantially non-collapsing properties.

Table 3

| ratio of raw materials | | Ignition Loss (%) | SiO$_2$ (%) | Al$_2$O$_3$ (%) | Fe$_2$O$_3$ (%) | CaO (%) | MgO (%) | Na$_2$O (%) | K$_2$O (%) |
|---|---|---|---|---|---|---|---|---|---|
| converter slag<br>red mud<br>electric furnace slag(oxidizing | 70%<br>30% | +0.68 | 14.60 | 8.70 | 32.70 | 32.00 | 3.70 | 1.00 | 0.40 |

Table 3-continued

| ratio of raw materials | | Ignition Loss (%) | $SiO_2$ (%) | $Al_2O_3$ (%) | $Fe_2O_3$ (%) | CaO (%) | MgO (%) | $Na_2O$ (%) | $K_2O$ (%) |
|---|---|---|---|---|---|---|---|---|---|
| period) | 70% | +0.51 | 17.00 | 11.20 | 34.30 | 28.80 | 4.20 | 1.01 | 0.48 |
| red mud | 30% | | | | | | | | |
| electric furnace slag(reducing period) | 70% | +0.43 | 23.10 | 11.70 | 17.10 | 35.00 | 4.80 | 0.94 | 0.30 |
| red mud | 30% | | | | | | | | |

In Table 1 through Table 3, each mixture consists of 70 percent of slag and 30 percent of red mud.

Table 4 shows the data relating to refractoriness pyrometric cone equivalent, collapsing ratio and amount of F.CaO, all of which varied corresponding to the change of red mud amount relative to that of molten slag produced by a converter furnace or an electric furnace.

TABLE 4

| | | ratio of raw materials | | | | | |
|---|---|---|---|---|---|---|---|
| | | electric furnace slag | | | | | |
| sample No. | converter slag | oxidizing period | reducing period | red mud | PCE (°C.) | collapsion (%) | F.CaO (%) |
| 1 | 100 | | | | 1520 | 12.9 | 5.1 |
| 2 | | 100 | | | 1510 | 2.3 | 1.7 |
| 3 | | | 100 | | 1540 | 100 | 0.1 |
| 4 | | | | 100 | 1250 | 0 | 0.0 |
| 5 | 95 | | | 5 | 1360 | 3.9 | 0.2 |
| 6 | 90 | | | 10 | 1320 | 1.5 | 0.0 |
| 7 | 80 | | | 20 | 1310 | 0.3 | 0.0 |
| 8 | 70 | | | 30 | 1320 | 0.1 | 0.0 |
| 9 | 50 | | | 50 | 1280 | 0.0 | 0.0 |
| 10 | | 95 | | 5 | 1350 | 1.8 | 0.2 |
| 11 | | 90 | | 10 | 1320 | 0.5 | 0.0 |
| 12 | | 80 | | 20 | 1180 | 0.3 | 0.0 |
| 13 | | 70 | | 30 | 1220 | 0.0 | 0.0 |
| 14 | | 50 | | 50 | 1230 | 0.0 | 0.0 |
| 15 | | | 95 | 5 | 1370 | 37.5 | 0.0 |
| 16 | | | 90 | 10 | 1320 | 18.2 | 0.0 |
| 17 | | | 80 | 20 | 1290 | 3.3 | 0.0 |
| 18 | | | 70 | 30 | 1235 | 1.2 | 0.0 |
| 19 | | | 50 | 50 | 1215 | 0.0 | 0.0 |

As can be observed from Table 4, although converter slag and electric-furnace slag produced at the oxidizing period and reducing period respectively may have greatly different chemical compositions in view of CaO, $SiO_2$, $Fe_2O_3$ and the like, when a desired amount of red mud which melts at considerably lower temperature relative to molten slag and which contains $Al_2O_3$ and $SiO_2$ is added to the slag, $3CaO.Al_2O_3$, $2CaO.2SiO_2$, $2CaO.Al_2O_3.SiO_2$ are mainly produced while $2CaO.SiO_2$ and F.CaO substantially disappear from the compositions.

Furthermore when substantially a good deal of red mud was added to the molten slag, the obtained processed slag became like a glassy material and was almost entirely free from $2CaO.SiO_2$ and F.CaO, whereby the experiment succeeded in the production of slag having non-collapsing properties.

In general, when molten slag is discharged or tapped from a converter furnace or an electric furnace, the temperature thereof is about 1500° C. and the heat capacity thereof is around 450,000 kcal/ton.

This heat capacity is capable of melting red mud up to about 20 percent of the molten slag after the addition of the red mud. It has also been found that the amount of red mud to be added must be more than 5 percent of the molten slag for producing the processed slag of stable composition which does not collapse.

As has been described heretofore, according to the process of this invention, the slag having collapsing properties which is produced by a converter furnace or an electric furnace is transformed to slag of non-collapsing properties by the addition of red mud into the molten slag.

In this invention, although the process as disclosed is specifically focused on the utilization of red mud as the material for producing slag having non-collapsing properties, it must be noted that slate and shale, both of which have substantially the same composition as red mud, can be used instead of red mud.

What is claimed is:

1. A process for treating slag from known converter and electric furnaces to improve the structural stability of such slag and render such slag suitable such as a landfill and construction material as well as a substitute for base material or crushed stone for road construction, comprising the steps of:
   (1) providing molten slag produced from a conventional converter or electric furnace in which the furnace is used in conventional steel production and wherein the molten slag when cooled contains Free CaO and $2CaO.SiO_2$ which render such cooled slag unsuitable for landfill purposes due to swelling and structural instability of the Free CaO and $2CaO.SiO_2$ therein,
   (2) adding red mud obtained as a by-product from the aluminum industry to the molten slag thereby creating a thermochemical reaction between the red mud and the molten slag to transform a composition of said cooled slag containing the Free CaO and $2CaO.SiO_2$ to a relatively non-swelling and non-crumbling composition, said red mud accounting for 5 to 20 percent of said molten slag after the addition of said red mud, said red mud comprising as a major component $Fe_2O_3$ and as a lesser component $Na_2O$, said red mud melting at a temperature lower than the melting temperature of said slag, and
   (3) utilizing the heat value of the molten slag to melt said red mud into said molten slag and cause said thermo-chemical reaction, whereby the thus processed cooled slag has structural ability rendering it suitable as a landfill.

2. A process according to claim 1, wherein said molten slag is provided in a ladle, and said red mud is added to the molten slag in said ladle.

3. A process according to claim 1, wherein said red mud melts at a temperature 200 to 300 degrees Centigrade lower than the melting temperature of said slag.

* * * * *